United States Patent [19]

Burg

[11] Patent Number: 4,739,719

[45] Date of Patent: * Apr. 26, 1988

[54] MOVABLE BOW SEAL AIR RIDE BOAT HULL

[76] Inventor: Donald E. Burg, 15840 SW. 84th Ave., Miami, Fla. 33157

[ * ] Notice: The portion of the term of this patent subsequent to Jul. 12, 2000 has been disclaimed.

[21] Appl. No.: 862,300

[22] Filed: May 12, 1986

Related U.S. Application Data

[63] Continuation-in-part of Ser. No. 737,403, Nov. 1, 1976, abandoned, and a continuation-in-part of Ser. No. 818,303, Jul. 25, 1977, Pat. No. 4,165,703, and a continuation-in-part of Ser. No. 69,771, Aug. 27, 1979, abandoned, and a continuation-in-part of Ser. No. 207,789, Nov. 17, 1980, abandoned, and a continuation-in-part of Ser. No. 269,908, Jun. 3, 1981, Pat. No. 4,392,445, and a continuation-in-part of Ser. No. 289,769, Aug. 3, 1981, abandoned, and a continuation-in-part of Ser. No. 343,287, Jan. 27, 1982, abandoned, and a continuation-in-part of Ser. No. 458,738, Jan. 17, 1983, abandoned, and a continuation-in-part of Ser. No. 465,670, Feb. 10, 1983, abandoned, and a continuation-in-part of Ser. No. 1,067, Jul. 11, 1983, Published Application No. WO85/00332, and a continuation-in-part of Ser. No. 584,728, Feb. 29, 1984, Pat. No. 4,587,918, and a continuation-in-part of Ser. No. 844,529, Mar. 27, 1986.

[51] Int. Cl.⁴ ................................................ B63B 1/38
[52] U.S. Cl. ..................................... 114/67 A; 180/126
[58] Field of Search .................... 114/67 A, 289, 290; 180/126, 127, 128

[56] References Cited

U.S. PATENT DOCUMENTS

| | | |
|---|---|---|
| 1,835,564 | 12/1931 | Grayson et al. . |
| 2,005,473 | 6/1935 | Sanden . |
| 2,231,296 | 2/1941 | Sartori . |
| 2,234,899 | 3/1941 | Higgins . |
| 3,027,860 | 4/1962 | Priest ............................ 180/126 X |
| 3,140,687 | 7/1964 | Beardsley . |
| 3,146,752 | 9/1964 | Ford . |
| 3,331,347 | 7/1967 | Von Heidenstom . |
| 3,353,617 | 11/1967 | Hopkins ............................ 180/128 |
| 3,473,503 | 10/1969 | Gunther ............................ 114/67 A |
| 3,476,069 | 11/1969 | Mantle et al. . |
| 3,477,400 | 11/1969 | Walker . |
| 3,518,956 | 7/1970 | Girodin . |
| 3,532,180 | 10/1970 | Ford et al. ............................ 180/126 |
| 3,547,064 | 12/1970 | Glass . |
| 3,581,696 | 6/1971 | Ilon . |
| 3,698,343 | 10/1972 | Boome . |
| 3,702,598 | 11/1972 | Szptyman . |
| 3,726,246 | 4/1973 | Wukowitz ............................ 114/67 A |
| 3,742,888 | 7/1973 | Crowley . |
| 3,800,725 | 4/1974 | L'Heureux ............................ 114/288 |
| 3,937,173 | 2/1976 | Stuart . |
| 4,029,036 | 6/1977 | Magnuson ............................ 114/67 A |
| 4,046,217 | 9/1977 | Magnuson . |
| 4,228,752 | 10/1980 | Sladek et al. ............................ 114/67 A |
| 4,392,445 | 7/1983 | Burg ............................ 114/67 A |
| 4,393,802 | 7/1983 | Rizzo ............................ 114/67 A |
| 4,494,473 | 1/1985 | Simpson ............................ 180/126 X |

FOREIGN PATENT DOCUMENTS

| | | | |
|---|---|---|---|
| 2315415 | 1/1977 | France ............................ | 180/127 |
| 1594973 | 8/1981 | United Kingdom ............... | 180/128 |

*Primary Examiner*—Sherman D. Basinger
*Attorney, Agent, or Firm*—Robert J. Van Der Wall

[57] ABSTRACT

An improved performance marine surface vessel with a recess in its underside that is pressurized with gas to form a supporting gas cushion that carries a substantial portion of vessel weight. The gas cushion is restrained by catamaran-like sidehulls, a movable seal forward, and substantially rigid aft seal. The recess is shaped on its upper surface to provide good ride qualities in rough seas and maximum stability in roll. In some instances a center hull and/or a skeg-like device are utilized to separate portions of the recess. The sidehulls can include secondary lifting surfaces on both sides to aid in operation with the pressurized gas supply not operating. The forward movable seal is best made in several elements that are individually removable through an opening in the front deck. The seal elements are formed at their top portion by a substantially rigid cap that also attaches the seal to the hull. The seal attachment apparatus allows staggering of seals, fore and aft, which improves entry into waves and provides an attractive pointed bow appearance. The pressurized gas supply into the recess can include exhaust gas from engines with the engines being protected when they are not operating by an exhaust valve. The gas supply to the forward movable seal and recess is controllable in a preferred embodiment of the invention.

41 Claims, 3 Drawing Sheets

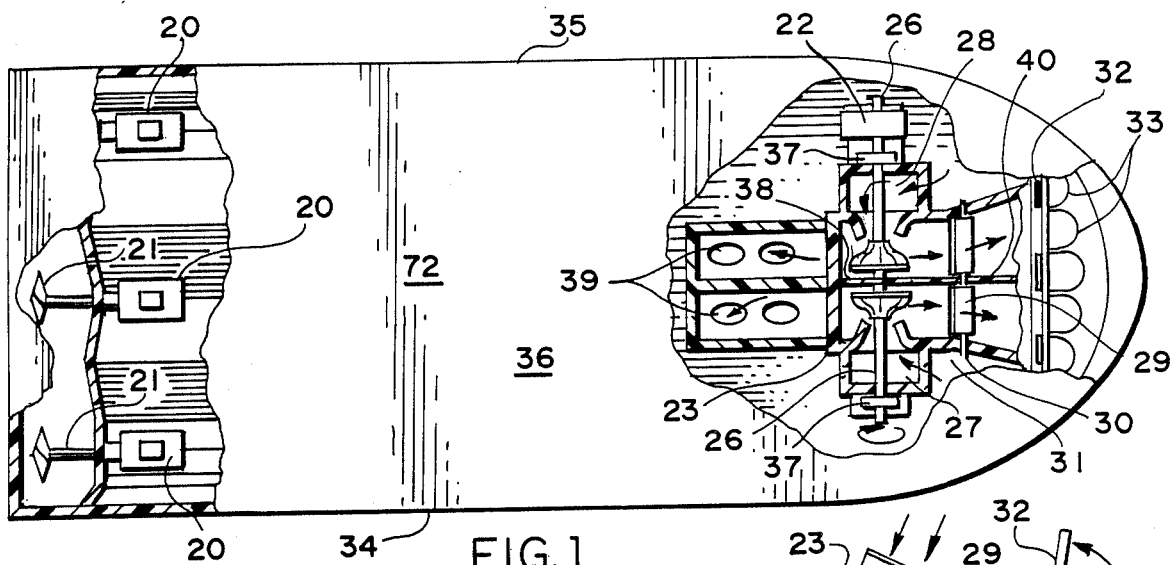
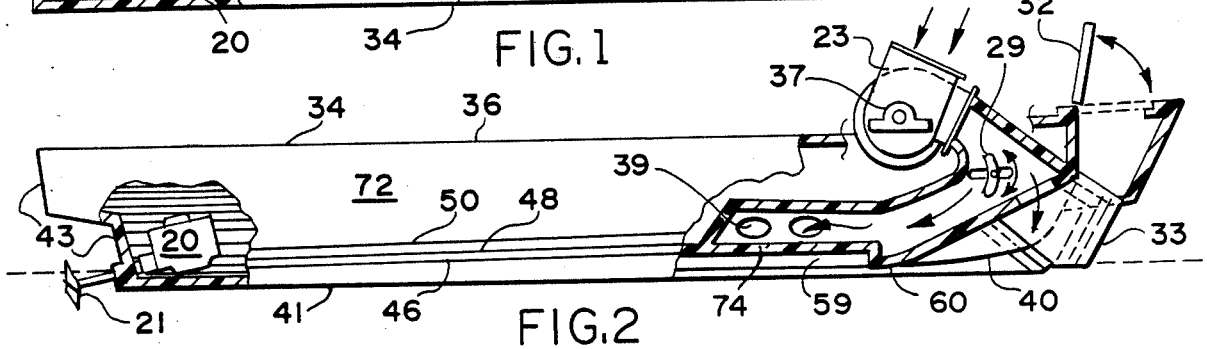
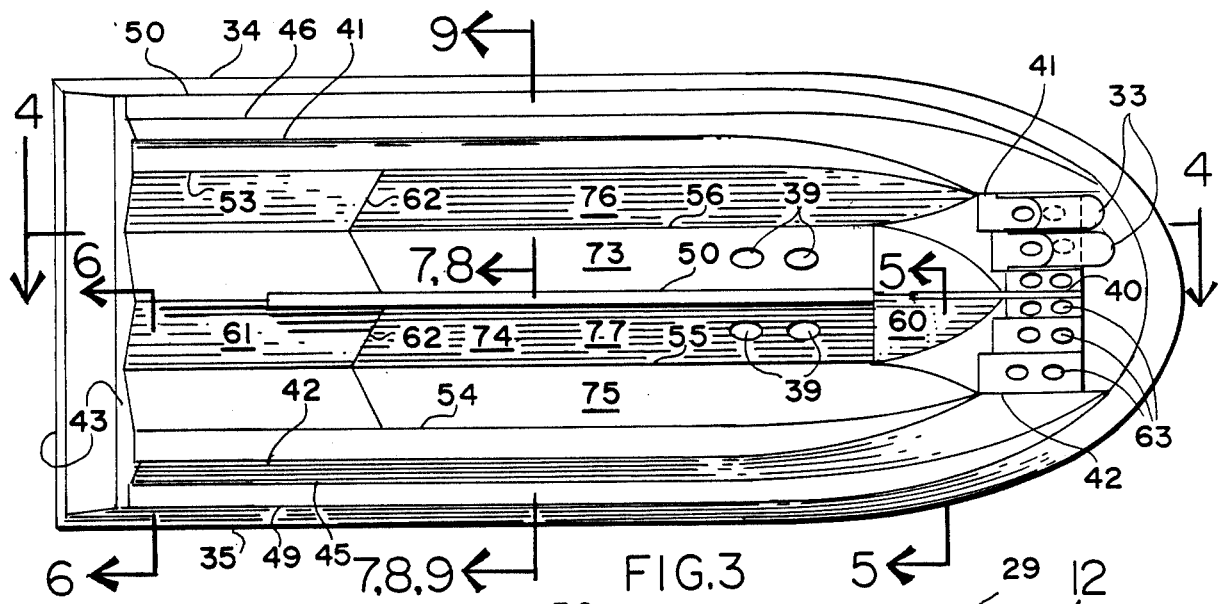
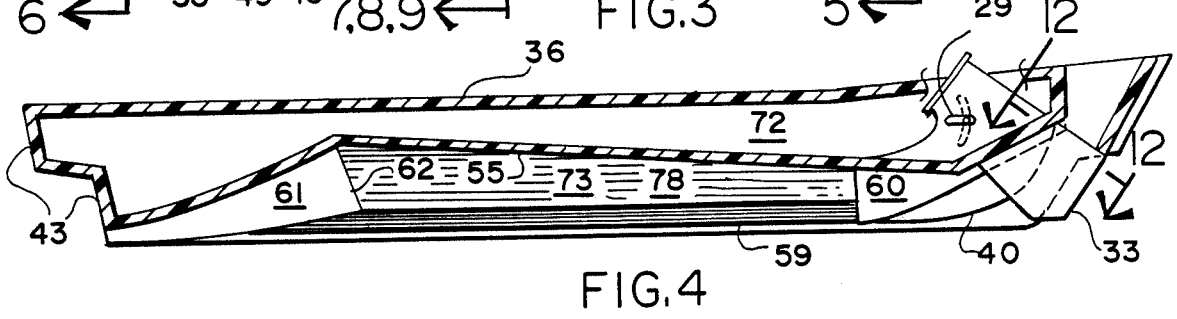

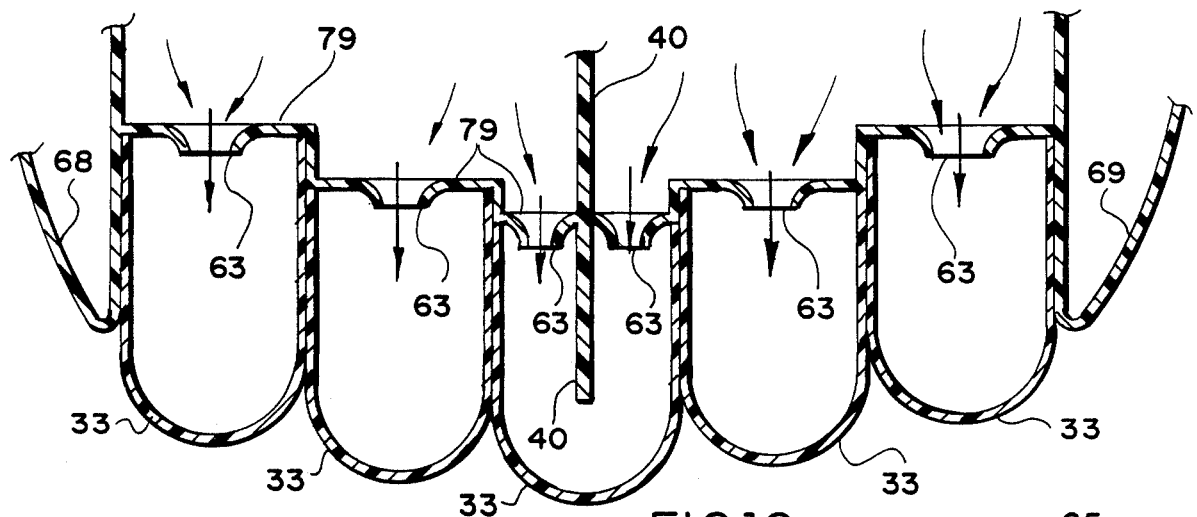
FIG. 12
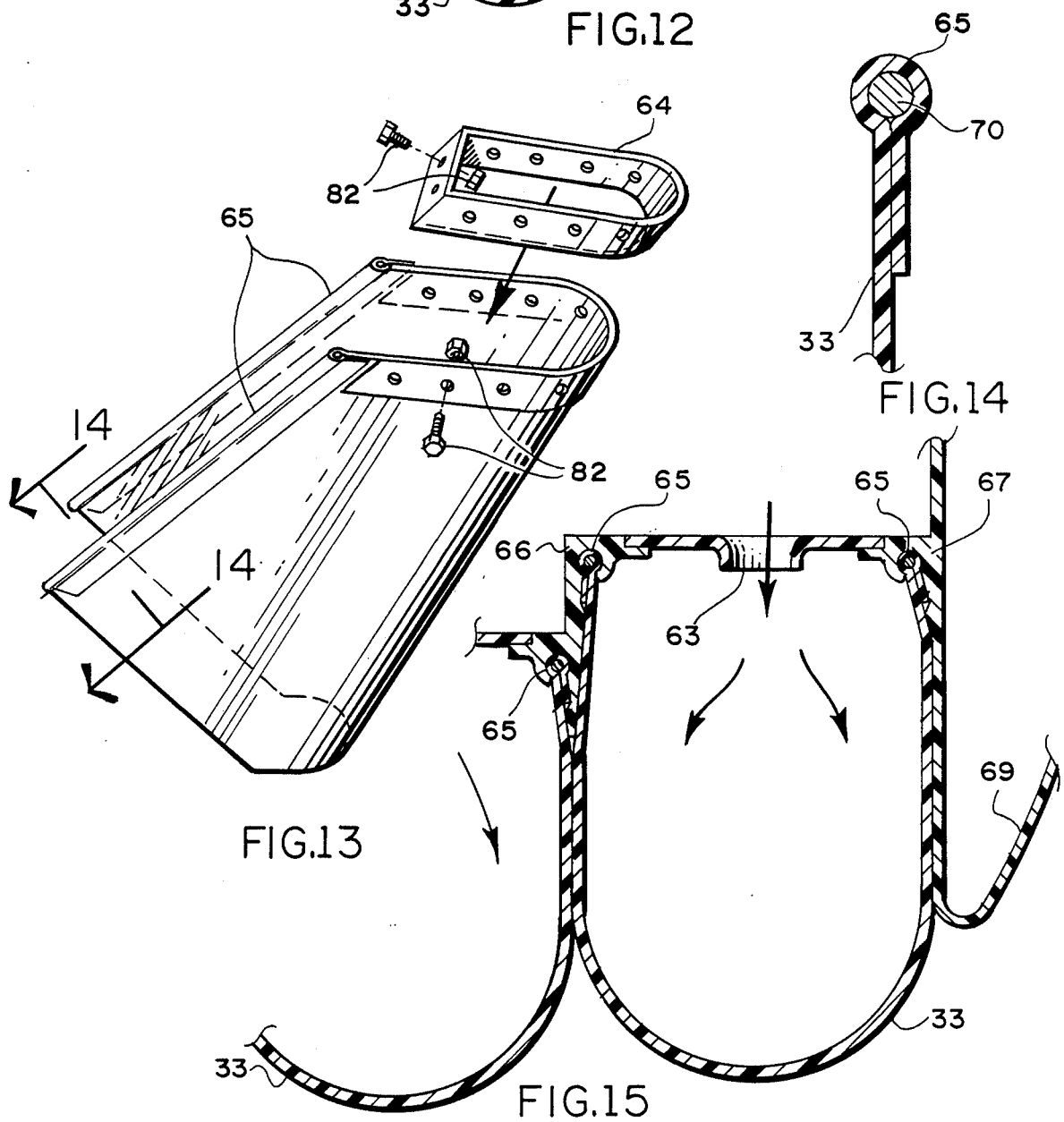
FIG. 13
FIG. 14
FIG. 15

MOVABLE BOW SEAL AIR RIDE BOAT HULL

This application is a continuation-in-part to applicant's earlier applications, Ser. No. 737,403 filed Nov. 1, 1976, now abandoned; Ser. No. 818,303 filed July 25, 1977, now U.S. Pat. No. 4,165,703 issued Aug. 27, 1979; Ser. No. 069,771 filed Aug. 27, 1979, now abandoned; Ser. No. 207,789 filed Nov. 17, 1980, now abandoned; Ser. No. 269,908 filed June 3, 1981, now U.S. Pat. No. 4,392,445 issued July 12, 1983; Ser. No. 289,769 filed Aug. 3, 1981, now abandoned; Ser. No. 343,287 filed Jan. 27, 1982, now abandoned; Ser. No. 458,738 filed Jan. 17, 1983, now abandoned; Ser. No. 465,670 filed Feb. 10, 1983, now abandoned; International Application No. PCT/US83/01067 filed July 11, 1983, now WO85/00332; Ser. No. 584,728 filed Feb. 29, 1984, now U.S. Pat. No. 4,587,918 issued May 13, 1986, and Ser. No. 844,529 filed Mar. 27, 1986.

FIELD OF THE INVENTION

This invention relates to the field of marine surface vessels supported at least in part by a pressurized gas cushion; with the gas supplied all or partially by a powered blower, gas turbine or other engine exhaust, or other artificial means; that is restrained in a recess or chamber in the underside of the hulls with particular improvements relating to an easily changed movable seal located at a forward portion of the air cavity, improvements in the recess and sidehull concepts to improve stability and ride quality, and means to vary pressure at the seal and portions of the gas cushion.

BACKGROUND OF THE INVENTION

The current invention is a further improvement to applicant's earlier inventions in this field. generally entitled "Air Ride Boat Hulls". All of these inventions require the introduction of pressurized gas into a recess in the underside of the boat hull to improve operating speeds and load carrying capabilities, allow elevation of the boat at dockside by filling the recess with pressurized gas, provide superior ride qualities, and improve stability and safety of operation.

All of the aforementioned features are provided while retaining fabrication and operation costs that are competitive with conventional hull designs. Much of the background for the current invention is discussed in applicant's earlier patents with a good summary of this background presented in U.S. Pat. Nos. 4,392,445 and 4,587,918 so that will not be restated here. The instant invention offers improvements and/or refinements to the latter referenced U.S. Pats. Nos. as are discussed in the following sections.

SUMMARY OF THE INVENTION

The object of the present invention is to offer the advantages of previous Air Ride boat hull concepts, as discussed in U.S. Pat. Nos. 4,392,445 and 4,587,918, coupled with further improvements in stability, ride quality, performance, handling of engine and blower exhaust and ease of seal fabrication, installation and replacement. Advances due to the preferred embodiments of the current invention include a recess or chamber that is bounded by improved high stability catamaran-like sidehulls that allow better operation, when the recess is not pressurized or is only partially pressurized with gas, especially when at rest or at low or intermediate speeds. This is possible since special secondary hydrostatic and/or hydrodynamic lifting surfaces, that primarily make water contact only when the recess is not pressurized, are located above the normal sidehull water contacting planing surfaces. The use of diverging sidehull keels allows the inner lifting surfaces to be at least partially shielded from wave impact during operation.

Further improvements to the preferred embodiment of the invention include separate recess longitudinal compartments, separated preferably on the hull centerline, with the compartments supplied with air from blower wheels that are driven by the same prime mover where possible. In the ideal situation, the blower wheels utilize a common drive system for simplicity and maximum safety of operation in a roll situation. It is also possible to incorporate a gas flow directing valve in a blower discharge duct to regulate pressures at the forward seal(s) and the gas cushion(s) after portions.

In the case of separate recess compartments, the compartments would preferably be of deep substantially inverted-V configurations to insure a cushioning effect from the pressurized gas when large waves are encountered. The substantially inverted-V recess compartment(s) can slope upward from fore to aft thereby allowing water waves in the recess to pass with minimum hull impact forces. The deep substantially inverted-V recess shapes and the fore to aft sloping of the top of the recess provides reduced gas compression loading effects due to the wave passing in the recess either individually or in combination. These substantially inverted-V recess shapes are normally carried aft and then lessen in depth, and therefore form less steep angles, as they approach the transom thereby forming a substantially rigid seal at the aft end of a recess. The use of a downwardly sloping substantially inverted-V aft seal design has proven to be extremely soft riding in a 65 foot Air Ride commerical vessel, the AIR RIDE EXPRESS, that has been in service since mid-1983.

The forward movable seals are preferably made of flexible material and formed into shape by having discharge gas from a blower impinging on their backside. The top of the seal elements are best attached to substantially rigid, preferably metal or fiberglass, end caps that in turn attach to the hull. Therefore, removal of a seal element requires only that an optional forward deck hatch be opened, the seal top cap bolts removed, and the selected seal element, including the top cap, removed. Installation is simply a reversal of this procedure.

The preferred embodiment attachment means for the sides of the seals is to lap the seal material over a rather stiff (high durometer) elastomeric material, preferably neopreme rubber, that is shaped as a rod or tube. The seal overlap and the rod or tube are then bonded together to form a rounded male seam that then slides into a mating female track in the boat. A means to stagger the individual seal elements fore and aft, while maintaining identical seal designs port and starboard, is provided by a unique extruded attaching system. In this system, both sides of a seal element attach in essentually the same plane with planes for alternate seal elements staggered fore and aft if desired. This concept also provides better wave impact characteristics since in frontal shape it presents a staggered V or inverted-V shape.

Another benefit of this invention is the ability to use engine exhaust to either fully or partially pressurize the gas cushion. A part of this concept involves use of a valve in some instances to prevent pressurized gas from the gas cushion from flowing back through an engine that is not operating as this could severely damage the engine. The benefits of supplying engine exhaust to the gas cushion are threefold: (1) a reduction in ambient noise level next to be boat and no need for mufflers, (2) a reduction heated exhaust signature which is especially important in the case of gas turbine installations, and (3) a reduction in or elimination of blower power requirements with a typical diesel engine exhaust flow capable of supplying about 15 percent of gas cushion needs and some gas turbine exhaust flows capable of supplying all of gas cushion needs.

The invention will be better understood upon reference to the drawings and detailed description of the invention which follow in which:

BRIEF DESCRIPTION OF THE DRAWINGS

FIG. 1 is a top partial cutaway view of a boat hull to the present invention showing typical engine and propulsor, surface propeller drives in this instance, installations and details of a blower, including its drive engine and discharge duct systems, and seal system at the forward portion of the hull.

FIG. 2 is a side partial cutaway view of a boat hull to the present invention showing the same items as FIG. 1 which includes a seal removal hatch, blower discharge valve, and openings for blower discharge gas into the hull recess.

FIG. 3 is a bottom view of a hull to the present invention including two seal elements for illustration but less the other machinery included in FIGS. 1 and 2.

FIG. 4 is a sectional longitudinal view of the inventive hull, as taken through section 4—4 of FIG. 3, which shows a sloping upper recess surface and the downwardly sloping rear rigid structure seal.

FIG. 5 is a partial sectional transverse view of the hull, as taken through section 5—5 of FIG. 3, which shows the intersection of and inverted V recess surfaces in phantom lines that make up an inverted V intersection while under the deckline of the hull and waterlines when under dynamic operation with the blower ON.

FIG. 8 is the same partial sectional view as presented in FIG. 7, as taken through section 8—8 of FIG. 3, but with a waterline that represents dynamic operation with the blower ON.

FIG. 12 is a sectional view of the movable seal elements as used in the preferred embodiment of the present invention, as taken through section 12—12 of FIG. 4, which shows blower gas inlets into the seal element compartments, preferred seal staggered attachment means, and divider as used to separate blower discharge gas flow.

FIG. 13 is an isometric projection of a typical seal element and seal top cap along with typical attachment hardware.

FIG. 14 is a sectional view, as taken through section 14—14 of FIG. 13, which shows detail of fabrication of the seal element side bead including the center high durometer elastometric member.

FIG. 15 is a greater detail sectional view of movable seal elements and their preferred attachment extrusions which include staggered female attachment means.

DETAILED DESCRIPTION

Figure 5:
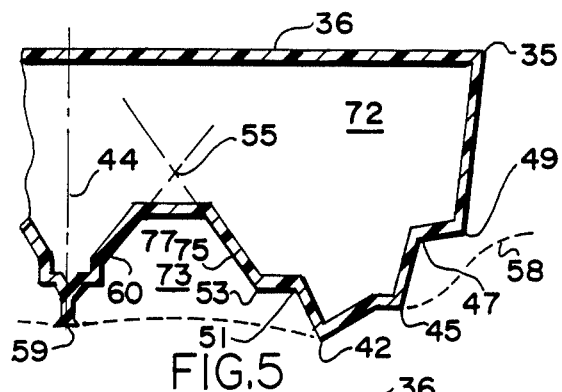

With reference to each of the aforementioned Figures in turn, and using like numerals to designate similar parts throughout the several views, a preferred embodiment and several alternative embodiments will now be described.

FIG. 1 discloses the top view of a boat to the inventive hull 72 showing main propulsor engines 20 and surface drives and propellers 21. The instant invention includes a unique exhaust system, not shown, for both propulsor engines 20 and blower engine 26 that involves discharging the exhaust into the gas cushion under the boat 72 after passing through a valve, with most any type of diverting, power actuated, or check valve that can operate in the exhaust environment being acceptable, to thereby supplement or replace blower 23 gas flow requirements with the valve necessary to prevent the flow of gas back into the engine when the engine is not operating.

Also shown in FIG. 1 are the blower 23 and its drive engine 26, blower shaft bearings 23, blower shaft 26, separated blower wheels 24 and 25, blower wheel divider 38, blower discharge valve or flap 29, blower discharge valve handle 31, blower discharge separator or divider 40, movable seal elements 33, port and starboard deck sheer lines 35 and 34, deck 36, and gas discharge openings into the recess 39. The use of separated blower wheels 24 and 25 and ducting contributes to overall system roll stability as is explained in following sections.

FIG. 2 discloses a side view of the inventive hull 72 with sections cut out to show a main engine 20 and drive including surface propeller 21. Note that other type drive systems, including waterjets, conventional propellers, etc. can be used. Also shown in this figure are the blower 23, blower bearing 37, blower discharge valve or flap 29, deck hatch 32 that is used during seal 33 removal, discharge openings 39 into gas recess 73, forward recess divider 40, center recess hull 74, center divider skeg 59, and bow member 60. Other items the transom 43, starboard deck sheer line 34, deck 36, starboard catamaran sidehull keel 41, and lower, middle, and upper starboard chine lines 46, 48, and 50.

FIG. 3 shows a bottom view of the inventive hull 72 less machinery but with two seal elements 33 in position for illustration. Shown are the center recess hull 73, recess bow 60, sidehull keels 53 and 54, lower outer chine lines 45 and 46, upper outer chine lines 49 and 50, deck sheer lines 34 and 35, recess 73, aft seal 61, aft seal forward line 62, forward divider 40, aft skeg divider 59, recess surfaces 75, 76, 77, and 78, inverted V intersections 55 and 56 (these are also the top of recess in this case), seal discharge orifices 63, and recess discharge orifices 39. It can be seen that secondary lifting surfaces as defined by lines 42 and 54 on the port side and 41 and 53 on the starboard side are shielded from water contact during normal dynamic operation when the blower is ON by the sidehulls as defined by forward sections of the diverging sidehull keels 42 and 41.

FIG. 4 is a sectional side view as taken through section 4—4 of FIG. 3 that shows a rising, fore to aft, recess top 55 although a slope in the other direction is also possible. The effect of a slope in the top of the chamber is to allow passing waves to present a different compressibility effect fore to aft which can be beneficial to ride quality when properly applied. Also shown are the aft seal 61, sidehull keel 42, transom 43, aft seal forward line 62, recess surface 78, recess bow 60, forward divider 40, blower discharge valve 29, recess center skeg 59, and deck 36. It can be seen that the seal elements can be easily removed through the opening that passes through the front of the deck 36.

FIG. 5 shows a transverse vertical plane of the hull 72 as taken through section 5—5 of FIG. 3. This view shows the dynamic calm sea waterline 58 as it would occur with the blower ON. Note that the inner and outer sidehull secondary lifting surfaces, as defined by 51 to 53 and 47 to 49 respectively, are clear of the waterline 58. Also shown in this figure are outer chines 45, 47, and 49, sheer 35, deck line 36, inner sidehull chines 51 and 53, recess surfaces 75 and 77, extended recess surfaces point of intersection 55, recess bow 60, and divider 40.

Figure 6:
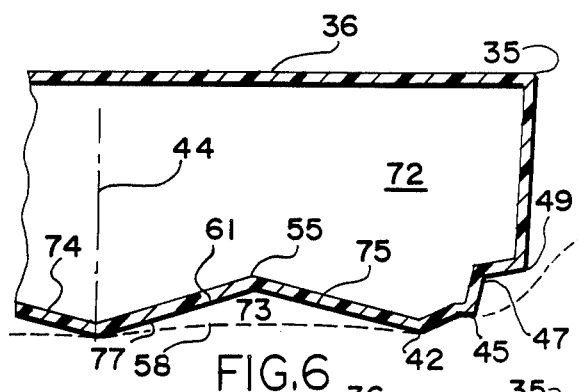
FIG. 6 is a partial sectional transverse view of the hull, as taken through section 6—6 of FIG. 3, which showns the aft substantially rigid seal configuration in transverse view.

FIG. 6 is a vertical transverse plane, as taken through section 6—6 of FIG. 3, showing a cross section through the aft seal 61. This shows the dramatically reduced depth of an inverted V as is required for aft end of recess gas cushion sealing. The term inverted V as used in this application can include planar and/or curvilinear surfaces. Also shown are the dynamic calm sea waterline 58, outer chines 45, 47, and 49, sheer 35, deck 36, hull vertical centerline 44, recess surfaces 75 and 77, point of inverted V 55, center hull 74, and catamaran sidehull keel 42.

Figure 7:
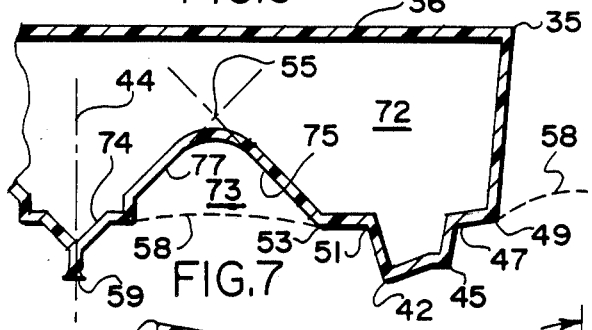
FIG. 7 is a partial sectional transverse view of the hull, as taken through section 7—7 of FIG. 3, which showns the waterline when underway with the blower OFF.

FIG. 7 is a vertical transverse plane as taken through section 7—7 of FIG. 3 that shows the dynamic calm sea waterline 58 when running with the recess 73 not pressurized. This shows that the secondary lifting surfaces on either side of the sidehull, as defined by 51 to 53 and 47 to 49, are being used for lift as they are water contacting. Also shown are the sheer line 35, deck 36, vertical centerline of the hull 44, center hull 74, and center recess dividing skeg 59, and intersection of recess surfaces 55. It is also to be noted that surfaces of the recess form an inverted V with the point of the V at 55, which is below the hull deck line 36, in a position to provide a deep inverted V in this vertical transverse plane of the hull 72. It is considered to be a definition of this application that an inverted V is formed by recess surfaces so long as said recess surfaces intersect, either directly or by extension as shown in this figure, in a transverse vertical plane of the hull to form a substantially inverted V shape while within an upper limit that is defined by the deck 36.

Figure 8:
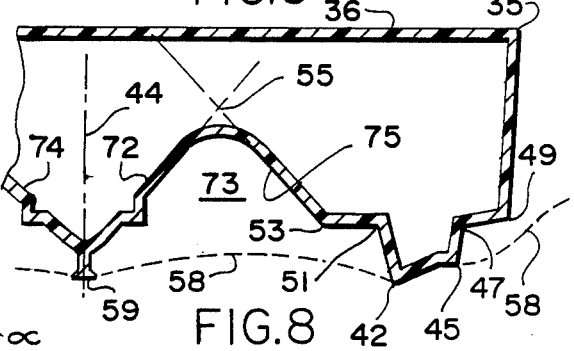

FIG. 8 is the same vertical transverse plane view as presented in FIG. 7 but with the dynamic waterline 58 shown for a running condition with the blower ON and the recess 73 pressurized with gas. Note that the secondary lifting surfaces, as defined by 51 to 53 and 47 to 49, are clear of the water during calm seal operation. Also shown are the catamaran sidehull keel 42, center hull 74, dividing skeg 59, recess surfaces 75 and 77, point of intersection of sidehull surfaces 55, and hull vertical centerline plane 44.

Figure 9:
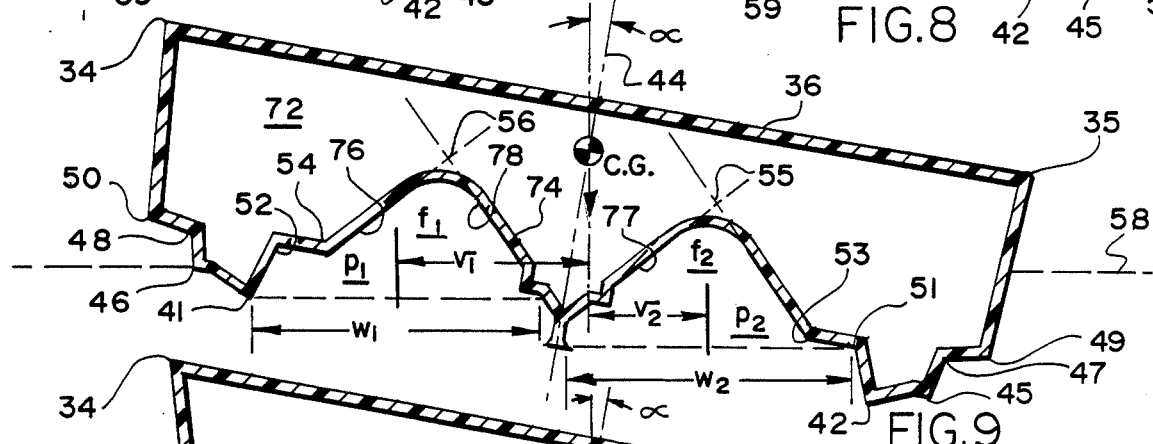
FIG. 9 is a transverse sectional view of the hull, as taken through section 9—9 of FIG. 3, with the hull in a ten degree roll situation to show the benefits of the deep inverted V separated compartments.

FIG. 9 presents a cross section of the hull 73 as seen in a vertical transverse plane as taken through 9—9 of FIG. 3 but while in a ten degree tilted condition. This was done to show the effect of the center hull 74, skeg 59, and the deep inverted V compartments on roll stability. Shown are the waterlines 58; port side outer chines 45, 47, and 49, inner chines 51 and 53, recess surfaces 75 and 77, intersection of recess surfaces 55, sidehull keel 42, and sheer 35; starboard side outer chines 46, 48, and 50, inner chines 52 and 54, recess surfaces 76 and 78, intersection of recess surfaces 56, sidehull keel 41, and shear 34; vertical centerline of the hull 44; deck line 36; center hull 74; and skeg 59.

Further items of interest are the location of center of gravity, designated by C.G., tilt or roll angle α, the gas cushion widths w1 and w2 on either side of the center hull 74 and skeg 59, cushion pressures p1 and p2, cushion lifting forces f1 and f2, and cushion lifting forces moment arms r1 and r2. Using these drawings and a scale of ¼ inch equals 1 foot results in a beam at the deck of 23 feet. Based on previous designs, this beam is appropriate for a 65 foot hull with a 50 foot long gas cushion.

The appropriate values are: w1 and w2, 7.7 and 7.7 ft.; p1 and p2, 42 and 125 pounds per square foot (psf); and r1 and r2, 5 and 3.5 ft. Note that the values of p1 and p2 are dependent on the depth of submergence below the sea level waterline. It is possible to calculate the moments about the C.G. where: Moments equal w×p×r×L. Using the just mentioned values, and a 50 ft. gas cushion length (L), the righting moment from the higher starboard side gas cushion is negative 80,850 ft-lb and for the lower port side is positive 168,438 ft-lb. The result is a positive 87,588 ft-lb of righting moment for the instant invention in this ten degree roll condition. Review of the following FIG. 10 discussion allows a comparison with a more conventional gas cushion hull design cushion effect righting moment.

Figure 10:
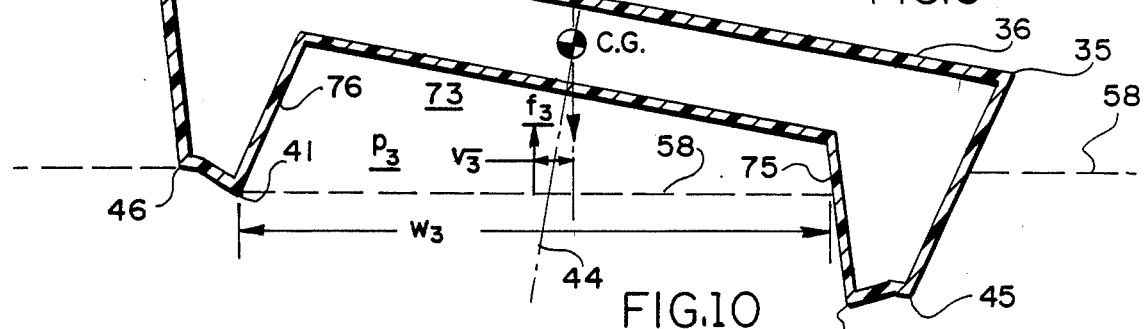
FIG. 10 is a transverse sectional view of another more conventional type pressurized gas cushion hull as done to compare stability in roll to the present invention as shown in FIG. 9.

FIG. 10 shows a more conventional gas cushion boat hull, commonly known in the United States as the Surface Effect Ship (SES), to the same proportions and at the same ten degree tilt or roll angle as the instant invention shown in FIG. 9. Shown are the deck 36, sheer lines 34 and 35, recess surfaces 75 and 76, pressurized gas cushion 73, hull vertical centerline 44, sidehull keels 41 and 42, chines 45 and 46, and waterlines 58.

Using the same analysis procedure as used just preceding for FIG. 9 and measured values as follows: w3, 15.6 ft.; p3, 42 psf; and r3, 1.5 ft., the righting moment due to gas cushion pressure is negative 49,140 ft-lb for this SES. So the overall effect of the gas cushion in this roll condition for the SES is to have the SES want to roll more. This must, of course, be compensated for by lift from the sidehulls but the condition can become severe and dangerous. Looking back at the instant invention, from the preceding discussion about FIG. 9, a positive righting moment of 87,588 ft-lb was realized. This means that, for the example given, the instant invention gas cushion supplies 2.78 times the righting force compared to the SES.

Figure 11:
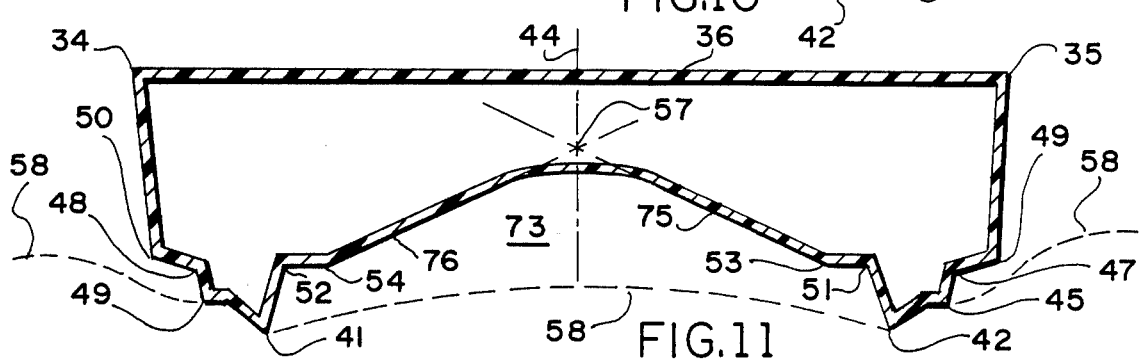
FIG. 11 presents a variation of the present invention with a single inverted V recess shape.

FIG. 11 shows a simpler version of the present invention that does not include a center hull. This concept provides good ride qualities although it does not provide the roll stability advantage as outlined in the discussions about FIGS. 9 and 10. The stern seal would preferably be a single inverted V for this arrangement.

Shown are the port outer sidehull chines 45, 47, and 49, port inner sidehull chines 51 and 53, starboard outer sidehull chines 46, 48, and 50, starboard inner sidehull chines 52 and 54, port sidehull keel 42, starboard sidehull keel 41, recess surfaces 75 and 76, recess surface intersection point 57, hull vertical centerline 44, sheer lines 34 and 35, gas cushion 73, dynamic waterlines 58, and deck line 36.

FIG. 12 is a cross sectional view as taken through section 12—12 of FIG. 4. This section shows seal elements 33, sidehull forward portions 68 and 69, gas flow duct divider 40, seal element attachment surfaces 79, and flow openings or orifices 63. The fact that the seal element attachment surfaces 79 and hence the seal elements 33 are staggered fore and aft provides for better water entry forward, stronger structure, and better appearance since a more or less standard pointed or rounded bow can be maintained.

FIG. 13 shows a typical movable seal element 33 with preferred arrangement seal element side beads 65 for attachment. Another important feature of this concept is the top cap 64, normally made of rigid material such as metal or fiberglass, which forms the seal element 33 into shape at its uppermost portion and also provides attachment means. Typical attachment fasteners 70 are also shown. The seal elements 33 themselves are normally made of a movable and preferably flexible material such as fabric reinforced rubber.

FIG. 14 is a sectional view taken through the seal side bead section 14—14 of FIG. 13. This attachment bead 65 is preferably made by lapping the seal itself over an elastomeric member 70 that is in the shape of a rod as shown although other shapes and materials are acceptable.

FIG. 15 presents an enlarged partial view of the elements and attachment means show in FIG. 12. This detail shows a sidehull 69, seal element attachment surface 79, gas flow orifice 63, seal element attachment beads 65, and seal elements 33. Importantly shown are outside corner seal attachment extrusion 66 and inside corner seal attachment extrusion 67. It is possible to make the inside corner unit 67 by machining of the outside corner unit 66 which reduces extrusion tooling and inventory costs.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by appended claims, which are the sole definition of the invention.

What is claimed is:

1. In an improved boat hull having a recess in its underside, said recess being pressurized with gas supplied by artificial means to create a restrained gas cushion between portions of the hull and a water surface, wherein said gas cushion is of sufficient pressure to support a significant portion of the weight of said boat hull, with a forward portion of said gas cushion restrained by a movable seal, the improvement comprising:

stabilizing, load carrying catamaran-like sidehulls beginning at a forward portion of and extending downwardly from the hull and having keels that are substantially parallel to each other over at least portions of their forward sections, said keels diverging aft of said parallel portions, said gas sealing forward movable seal extending substantially between portions of said sidehull keels; and at least one substantially rigid aft gas sealing member, said sealing member including at least one substantially inverted V shape as formed by an intersection of recess surfaces when viewed in a vertical transverse plane of the hull with said intersection disposed below a deck line of the hull.

2. The hull of claim 1 wherein the recess includes at least one substantially inverted shape as formed by an intersection of recess surfaces when viewed in a vertical transverse plane of the hull with said intersection disposed below a deck line of the hull.

3. The hull of claim 1 wherein the uppermost fore and aft portions of the recess are at different elevations.

4. The hull of claim 1 wherein the said sidehulls include lifting surfaces on the recess side of said sidehulls, said lifting surfaces being substantially outboard of a forward portion of said sidehull keels, and said lifting surfaces being at an angle closer to horizontal than an angle of an inner surface of the sidehull; and said sidehulls also including lifting surfaces on an outer side of said sidehulls whereby said outer lifting surfaces are at a substantially lesser angle to horizontal than an angle of a side of the hull.

5. The hull of claim 1 wherein the recess is comprised of substantially separate compartments with at least two compartments supplied by separate gas pressurizing means with said separate gas pressurizing means powered by a common prime mover.

6. The hull of claim 1 which further comprises at least one bow member proximal the recess.

7. The hull of claim 1 wherein an element of a movable seal includes a substantially rigid top cap that is fastened to a forward upper portion of said seal element.

8. The hull of claim 1 wherein an element of a movable seal includes a side bead fastener made of portions of the seal secured to an elastomeric member whereby said side bead fasteners slide into tracks where said tracks are fastened to the hull and extend over a length of a rear portion of said seal element when said seal element is installed.

9. The hull of claim 1 wherein an element of a movable seal is fastened to the hull using substantially parallel attachment means that mate with fasteners on either side of said seal element, said parallel attachment means for a single seal element being in substantially the same plane, at least some sets of said attachment means for different seal elements being staggered fore and aft, and staggered elements of the movable seal having sides that are substantially parallel to each other and are substantially parallel to sides of other staggered seal elements.

10. The hull of claim 1 wherein elements of said movable seal may be removed by on-board personnel through a forward deck opening, with said deck opening at least partially disposed in a portion of a deck that extends forwardly of a seal element, with the boat waterborne.

11. The hull of claim 1 wherein a valve is disposed in a blower discharge duct directly between a blower and a movable seal element thereby allowing control of an amount of blower discharge gas directed against the movable seal element.

12. The hull of claim 1 wherein the improvement further comprises a hull shaped member located proximal to said recess.

13. The hull of claim 1 wherein the improvement further comprises a skeg located proximal said recess, with said skeg including a substantially horizontal surface proximal its lower portion.

14. The hull of claim 1 wherein the improvement further comprises separate blower wheels on a common drive shaft that are separated by a divider member with the separate blower wheels supplying separate gas cushions thereby creating a substantially independent, but commonly powered, gas pressurizing means for the gas cushions.

15. In an improved boat hull having a recess in its underside, said recess being pressurized with gas supplied by artificial means to create a restrained gas cushion between portions of the hull and a water surface, wherein said gas cushion is of sufficient pressure to support a significant portion of the weight of said boat hull, with a forwrad portion of said gas cushion restrained by a movable seal, the improvement comprising:

stabilizing, load carrying catamaran-like sidehulls beginning at a forward portion of and extending downwardly from the hull, said gas sealing forward movable seal extending substantially between portions of a keel of said sidehulls, and said sidehull keels diverging aft of said movable seal, said recess including at least one substantially inverted V shape as defined by the intersection of recess surfaces when viewed in a vertical transverse plane of the hull with said intersection disposed below a deck line of the hull; and at least one substantially rigid aft gas sealing member, said sealing member including at least one substantially inverted V shape as formed by an intersection of recess surfaces when viewed in a vertical transverse plane of the hull with said intersection disposed below a deck line of the hull.

16. The hull of claim 15 wherein the uppermost fore and aft portions of the recess are at different elevations.

17. The hull of claim 15 wherein said sidehulls include lifting surfaces on the recess side of said sidehull, said lifting surfaces being substantially outboard of a forward portion of said sidehull keels, and said lifting surfaces being at an angle closer to horizontal than an angle of an inner surface of the sidehull; and said sidehulls also including lifting surfaces on an outer side of said sidehulls whereby said outer lifting surfaces are at a substantially lesser angle to horizontal than an angle of a side of the hull.

18. The hull of claim 15 wherein the recess is comprised of substantially separate compartments with at least two compartments supplied by separate gas pressurizing means with said separate gas pressurizing means powered by a common prime mover.

19. The hull of claim 15 which further comprises at least one bow member proximal the recess.

20. The hull of claim 15 wherein an element of a movable seal includes a substantially rigid top cap that is fastened to a forward upper portion of said seal element.

21. The hull of claim 15 wherein an element of a movable seal includes a side bead fastener made of portions of the seal secured to an elastomeric member whereby said side bead fasteners slide into tracks where said tracks are fastened to the hull and extend over a length of a rear portion of said seal element when said seal element is installed.

22. The hull of claim 15 wherein an element of a movable seal is fastened to the hull using substantially parallel attachment means that mate with fasteners on either side of said seal element, said parallel attachment means for a single seal element being in substantially the same plane, at least some sets of said attachment means for different seal elements being staggered, fore and aft, and staggered elements of the movable seal having sides that are substantially parallel to each other and are substantially parallel to sides of other staggered seal elements.

23. The hull of claim 15 wherein a valve is disposed in a blower discharge duct directly between a blower and a movable seal element thereby allowing control of an amount of blower discharge gas directed against the movable seal element.

24. The hull of claim 15 wherein the improvement further comprises a hull shaped member located proximal to said recess.

25. The hull of claim 16 wherein the improvement further comprises a skeg located proximal said recess, with said skeg including a substantially horizontal surface proximal its lower portion.

26. The hull of claim 16 wherein the improvement further comprises separate blower wheels on a common drive shaft that are separated by a divider member with the separate blower wheels supplying separate gas cushions thereby creating a substantially independent, but commonly powered, gas pressurizing means for the gas cushions.

27. The hull of claim 15 wherein elements of said movable seal may be removed by on-board personnel through a forward deck opening, with said deck opening at least partially disposed in a portion of a deck that extends forwardly of a seal element, with the boat waterborne.

28. In an improved boat hull having a recess in its underside, said recess being pressurized with gas supplied by artificial means to create a restrained gas cushion between portions of the hull and a water surface, wherein said gas cushion is of sufficient pressure to support a significant portion of the weight of said boat hull, with a forward portion of said gas cushion restrained by a movable seal, the improvement comprising:

stabilizing, load carrying catamaran-like sidehulls beginning at a forward portion of and extending downwardly from the hull, said gas sealing forward movable seal extending substantially between portions of a keel of said sidehulls, and said sidehull keels diverging aft of said movable seal, said recess including a divider that is at least partially hull shaped, said divider forward portion beginning proximal a movable seal, and said divider extending over a majority of a length of said recess; and at least one substantially rigid aft gas sealing member, said sealing member including surfaces angled to horizontal, where said angled surfaces extend over a majority of said sealing member width, when viewed in a vertical transverse plane of the hull.

29. The hull of claim 28 wherein said aft gas sealing member includes at least one substantially inverted V shape as formed by an intersection of recess surfaces when viewed in a vertical transverse plane of the hull with said intersection disposed below a deck line of the hull.

30. The hull of claim 28 wherein said recess includes at least one substantially inverted V shape as formed by an intersection of recess surfaces when viewed in a vertical transverse plane of the hull with said intersection disposed below a deck line of the hull.

31. The hull of claim 28 wherein uppermost fore and aft portions of a recess are at different elevations.

32. The hull of claim 28 wherein said sidehulls include lifting surfaces on the recess side of said sidehull, said lifting surfaces being substantially outboard of a forward portion of said sidehull keels, and said lifting surfaces being at an angle closer to horizontal than an angle of an inner surface of the sidehull; and
said sidehulls also including lifting surfaces on an outer side of said sidehulls whereby said outer lifting surfaces are at a substantially lesser angle to horizontal than an angle of a side of the hull.

33. The hull of claim 28 wherein the sidehulls have keels that are substantially parallel to each other over at least portions of their forward sections.

34. The hull of claim 28 wherein an element of a movable seal includes a substantially rigid top cap that is fastened to a forward upper portion of said seal element.

35. The hull of claim 28 wherein an element of a movable seal includes a side bead fastener made of portions of the seal secured to an elastomeric member; and
said side bead fasteners slide into tracks where said tracks are fastened to the hull and extend over a length of a rear portion of said seal element when said seal element is installed.

36. The hull of claim 28 wherein an element of a movable seal is fastened to the hull using substantially parallel attachment means that mate with fasteners on either side of said seal element, said parallel attachment means for a single seal element being in substantially the same plane, at least some sets of said attachment means for different seal elements being staggered fore and aft, and staggered elements of the movable seal have sides that are substantially parallel to each other and are substantially parallel to the sides of the other staggered seal elements.

37. The hull of claim 28 wherein a valve is disposed in a blower discharge duct directly between a blower and a movable seal element thereby allowing control of an amount of blower discharge gas directed against the movable seal element.

38. The hull of claim 28 wherein said recess includes at least one substantially inverted V shape as defined by the intersection of recess surfaces when viewed in a vertical transverse plane of the hull with said intersection disposed below a deck line of the hull.

39. The hull of claim 28 wherein the improvement further comprises a skeg located proximal said recess, with said skeg including a substantially horizontal surface proximal its lower portion.

40. The hull of claim 28 wherein the improvement further comprises separate blower wheels on a common drive shaft that are separated by a divider member with the separate blower wheels supplying separate gas cushions thereby creating a substantially independent, but commonly powered, gas pressurizing means for the gas cushions.

41. The hull of claim 28 wherein elements of said movable seal may be removed by on-board personnel through a forward deck opening at least partially located in a portion of a deck that extends forwardly of a seal element, with the boat waterborne.

* * * * *